United States Patent [19]
Ohkura et al.

[11] Patent Number: 6,005,601
[45] Date of Patent: Dec. 21, 1999

[54] APPARATUS FOR AND METHOD OF CONTROLLING DISPLAY OF ELECTRONIC PROGRAM GUIDE

[75] Inventors: Yukiko Ohkura, Tokyo; Hideo Terasawa, Kanagawa; Yuji Morimiya, Chiba; Tetsuya Kohno, Kanagawa; Keiji Yuzawa; Yuriko Kishitaka, both of Saitama; Kazuhiro Akaike, Kanagawa, all of Japan

[73] Assignee: Sony Corporation, Tokyo, Japan

[21] Appl. No.: 08/796,679

[22] Filed: Feb. 6, 1997

[30] Foreign Application Priority Data

Feb. 14, 1996 [JP] Japan ................................. 8-026446
Jul. 23, 1996 [JP] Japan ................................. 8-212040

[51] Int. Cl.$^6$ .................................................. H04N 7/10
[52] U.S. Cl. ................................................ 348/7; 348/906
[58] Field of Search .................................. 348/7, 12, 13, 348/96, 906; 380/49; H04N 7/10

[56] References Cited

U.S. PATENT DOCUMENTS

| | | | |
|---|---|---|---|
| 5,519,780 | 5/1996 | Woo et al. | 348/467 |
| 5,589,892 | 12/1996 | Knee et al. | 348/731 |
| 5,592,551 | 1/1997 | Lett et al. | 348/7 |
| 5,596,373 | 1/1997 | White et al. | 348/906 |
| 5,623,613 | 4/1997 | Rowe et al. | 395/353 |
| 5,805,763 | 9/1998 | Lawler et al. | 348/12 |
| 5,808,608 | 9/1998 | Young et al. | 348/906 |
| 5,822,014 | 10/1998 | Steyer et al. | 348/563 |

FOREIGN PATENT DOCUMENTS

| | | |
|---|---|---|
| 0 682 452 | 11/1995 | European Pat. Off. . |
| WO 92 04801 | 3/1992 | WIPO . |
| WO 95 15646 | 6/1995 | WIPO . |

*Primary Examiner*—Howard Britton
*Assistant Examiner*—Nhon T. Diep
*Attorney, Agent, or Firm*—Frommer Lawrence & Haug, LLP.; William S. Frommer

[57] ABSTRACT

Program information can be obtained quickly and accurately. An area X1 on which date and day are displayed is disposed at the left end of a screen and an area X2 in which time is displayed is disposed adjacent to the area X1 in the right-hand side. An area Y in which title of program, etc., are displayed is disposed adjacent to the area X2 in the right-hand side. An area Z in which genre is displayed is disposed adjacent to the area Y in the right-hand side. Information displayed on the respective areas are sequentially arranged in the longitudinal direction. A user can select information of a desired program by moving cursors 100X1, 100X2, 100Y, 100Z of the respective areas.

20 Claims, 15 Drawing Sheets

Genre Selection Picture

Program List Picture

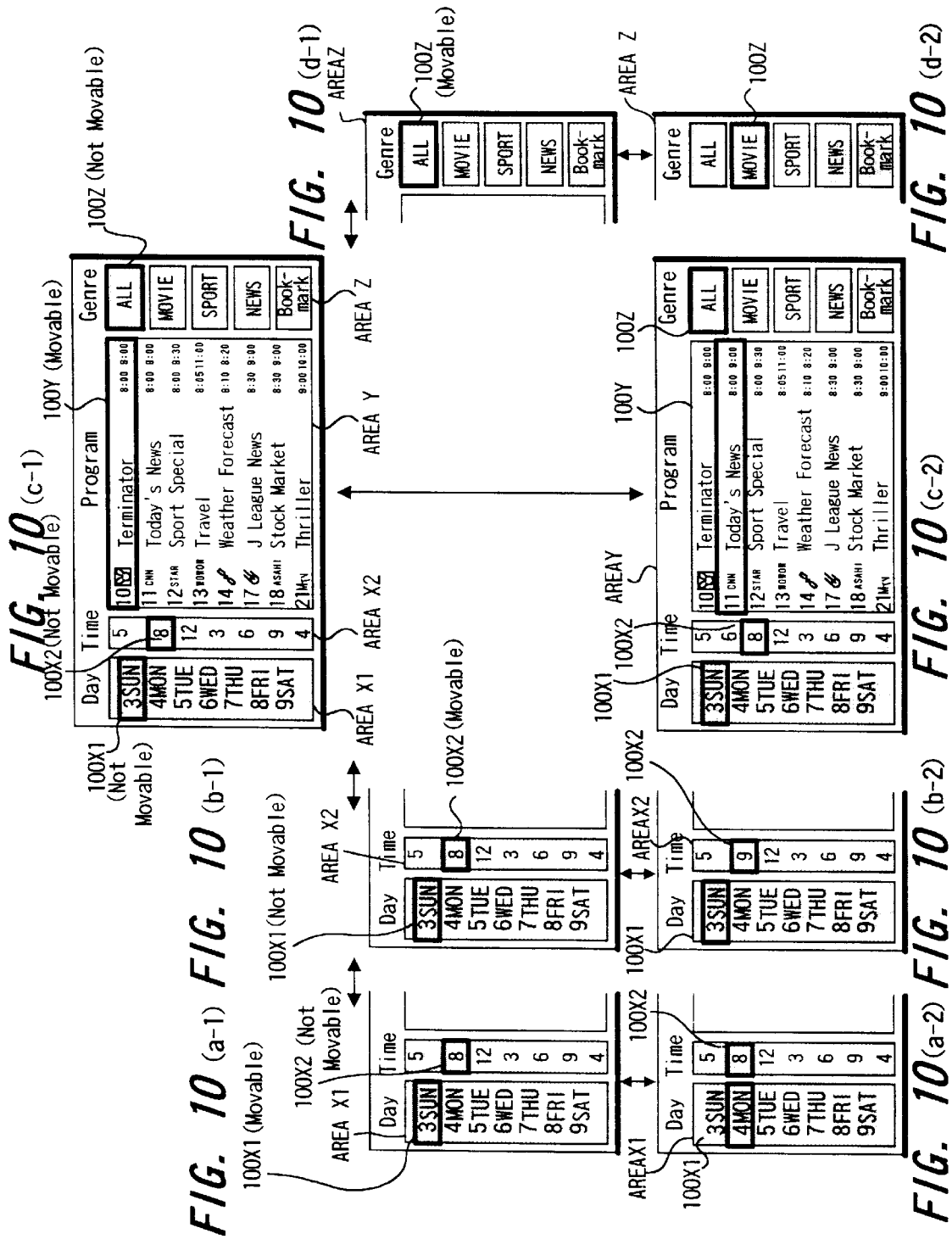

FIG. 11A

| Day | Time | Program | | | Genre |
|---|---|---|---|---|---|
| 3 SUN | 5 | 10 | Terminator | 8:00 9:00 | ALL |
| 4 MON | 8 | 11 CNN | Today's News | 8:00 9:00 | MOVIE |
| 5 TUE | 12 | 12 STAR | Sport Special | 8:00 9:30 | |
| 6 WED | | 13 WOWOW | Travel | 8:05 11:00 | SPORT |
| 7 THU | 3 | 14 | Weather Forecast | 8:10 8:20 | NEWS |
| 8 FRI | 6 | 17 | J League News | 8:30 9:00 | |
| 9 SAT | 9 | 18 ASAHI | Stock Market | 8:30 9:00 | Book-mark |
| | 4 | 21 MTV | Thriller | 9:00 10:00 | |

AREA X1  AREA X2  AREA Y  AREA Z

FIG. 11B

| Day | Time | Program | | | Genre |
|---|---|---|---|---|---|
| 3 SUN | 5 | 10 | Terminator | 8:00 9:00 | ALL |
| 4 MON | 6 | 11 CNN | Today's News | 8:00 9:00 | MOVIE |
| 5 TUE | 9 | 12 STAR | Sport Special | 8:00 9:30 | |
| 6 WED | 12 | 13 WOWOW | Travel | 8:05 11:00 | SPORT |
| 7 THU | 3 | 14 | Weather Forecast | 8:10 8:20 | NEWS |
| 8 FRI | 6 | 17 | J League News | 8:30 9:00 | |
| 9 SAT | 9 | 18 ASAHI | Stock Market | 8:30 9:00 | Book-mark |
| | 4 | 21 MTV | Thriller | 9:00 10:00 | |

FIG. 11C

| Day | Time | Program | | | Genre |
|---|---|---|---|---|---|
| 3 SUN | 5 | 10 | Terminator | 9:00 9:30 | ALL |
| 4 MON | 6 | 11 CNN | Today's News | 9:00 9:30 | MOVIE |
| 5 TUE | 9 | 12 STAR | Sport Special | 9:04 9:30 | |
| 6 WED | 12 | 13 WOWOW | Travel | 9:05 10:00 | SPORT |
| 7 THU | 3 | 14 | Weather Forecast | 9:10 9:20 | NEWS |
| 8 FRI | 6 | 17 | J League News | 9:30 10:30 | |
| 9 SAT | 9 | 18 ASAHI | Stock Market | 9:30 10:00 | Book-mark |
| | 4 | 21 MTV | Thriller | 10:00 11:00 | |

FIG. 11D

| Day | Time | Program | | | Genre |
|---|---|---|---|---|---|
| 3 SUN | 5 | 10 | Terminator | 5:00 5:30 | ALL |
| 4 MON | 6 | 11 CNN | Today's News | 5:00 5:50 | MOVIE |
| 5 TUE | 9 | 12 STAR | Sport Special | 5:04 5:30 | |
| 6 WED | 12 | 13 WOWOW | Travel | 5:05 6:00 | SPORT |
| 7 THU | 3 | 14 | Weather Forecast | 5:10 5:20 | NEWS |
| 8 FRI | 6 | 17 | J League News | 5:30 6:00 | |
| 9 SAT | 9 | 18 ASAHI | Stock Market | 5:30 6:00 | Book-mark |
| | 4 | 21 MTV | Thriller | 6:00 7:00 | |

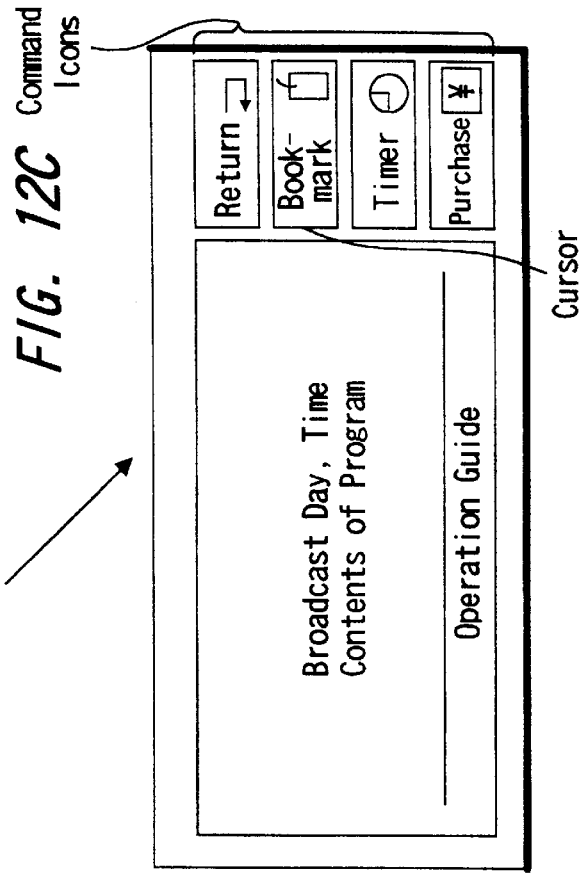
FIG. 12A
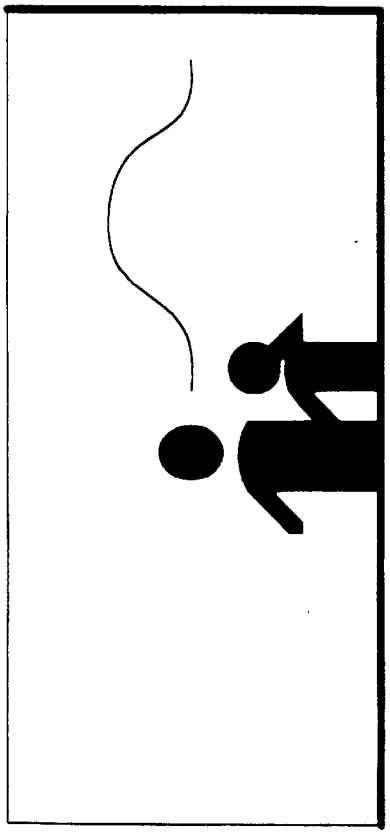
FIG. 12C
FIG. 12B

APPARATUS FOR AND METHOD OF CONTROLLING DISPLAY OF ELECTRONIC PROGRAM GUIDE

FIELD OF THE INVENTION

The present invention relates to apparatus for and method of controlling display of electronic program guide, and more particularly relates to apparatus for and method of controlling display of electronic program guide in which information concerning many programs can be obtained quickly and accurately.

BACKGROUND OF THE INVENTION

Recently, there has been widespread the system in which a television signal is transmitted through a satellite such as a broadcasting satellite or communication satellite and received at homes. This system is able to maintain nearly 150 channels and to broadcast very many programs.

In the above-mentioned system, it is proposed that EPG (electronic program guide) is transmitted, received and displayed at a reception side and a user selects a desired program from this electronic program guide.

The manner in which EPG is displayed will be described with reference to FIGS. 1A and 1B. FIG. 1A shows a genre selection picture on which a plurality of genres such as "ALL" (all genres), "NEWS" (news), "MOVIE" (movie) or "SPORT" (sport) are displayed. A user can move a cursor (not shown in FIG. 1A) on the display screen by operating an operation device such as a remote commander to select a desired genre from these genres.

When the user selects a desired genre on the genre selection picture shown in FIG. 1A, the genre selection picture is switched to a program list picture shown in FIG. 1B in response to the selected genre.

In the program list picture shown in FIG. 1B, broadcasting station names (channels) are displayed on the vertical axis and time is displayed on the horizontal axis. A title of program which is to be broadcast on that time is displayed at the position determined by the two axes.

When "ALL" is selected in the genre selection picture shown in FIG. 1A, for example, a picture of a monitor (television receiver) is switched from the genre selection picture to the program list picture shown in FIG. 1B. Programs of all genres for every channels are displayed on the switched program list picture.

Only a part of actual program list is displayed on the program list picture shown in FIG. 1B. When the user wants to see positions other than the area which is now displayed, the user can move a display area of one picture shown in FIG. 2 upper, lower, right and left by using the operation device such as the remote commander.

The user can watch the desired program (or information concerning the desired program) by placing the cursor to the display position of a desired program from a group of programs displayed on the program list picture.

However, the EPG encounters with the following problems.

Specifically, since the program list picture shown in FIG. 1B has a large number of channels and times on the upper, lower, right and left directions as shown in FIG. 2, the user has to scroll the display area of one picture shown in FIG. 2 in two directions of the upper and lower direction and the right and left direction, and hence this is very cumbersome for the user.

Further, in the EPG, as described above, the genre selection picture shown in FIG. 1A and the program list picture shown in FIG. 1B are formed of independent pictures (i.e., the genre selection picture and the program list picture are displayed hierarchically). Accordingly, when the user watches any one of picture (e.g., program list picture), the user cannot watch the other picture (e.g., genre selection picture). Thus, when the user wants to watch a different picture, the user has to change the hierarchy of the displayed pictures, which also is cumbersome for the user.

SUMMARY OF THE INVENTION

In view of the aforesaid aspect, it is an object of the present invention to provide apparatus for and method of controlling display of electronic program guide in which the user can select a desired program or program information rapidly and reliably.

According to an aspect of the present invention, there is provided an electronic program guide display control apparatus for controlling a manner in which an electronic program guide for selecting a program is displayed on a display apparatus. This electronic program guide display control apparatus is comprised of a date displaying means for displaying a broadcast date of the program in a first area of a plurality of areas which result from dividing a display area of the program in the longitudinal direction, a title display means for displaying a title of the program on a second area of a plurality of areas which result from dividing a display area of the display apparatus in the longitudinal direction, a designating means for designating a predetermined one from display on the area, and a changing means for changing display of the second area to a title of a program of the designated broadcast date.

In the above electronic program guide display control apparatus, the date display means displays broadcast date of program on the first area of a plurality of areas which result from dividing the display area of the display apparatus in the longitudinal direction, and the title display means displays a title of program on the second area of a plurality of areas which result from dividing the display area of the display apparatus in the longitudinal direction. The designating means designates a predetermined display of displays on the area, and the changing means changes display of the second area to a title of program of the designated broadcast date when a predetermined date of broadcast dates on the first area is designated.

According to another aspect of the present invention, there is provided an electronic program guide display control method of controlling a manner in which an electronic program guide for selecting a program is displayed on a display apparatus. This electronic program guide display control method is comprised of the steps of displaying a broadcast date of the program in a first area of a plurality of areas which result from dividing a display area of the program in the longitudinal direction, displaying a title of the program on a second area of a plurality of areas which result from dividing a display area of the display apparatus in the longitudinal direction, designating a predetermined one from display on the area, and changing display of the second area to a title of a program of the designated broadcast date.

In the above electronic program guide display control method, a broadcast date of program is displayed on the first area of a plurality of areas which result from dividing the display area of the display method in the longitudinal direction, and a title of program is displayed on the second area of a plurality of areas which result from dividing the display area of the display method. A predetermined display of display on the area is designated. When a predetermined date of broadcast dates on the first area is designated, the display on the second area is changed to a tile of program of the designated broadcast date.

BRIEF DESCRIPTION OF THE DRAWINGS

FIG. 10 is a pictorial representation illustrating a manner in which cursors of the cylinder EPG shown in FIG. 6 are moved;

FIGS. 11A through 11D are pictorial representations used to explain a manner in which cursors of the area Y within the cylinder EPG are moved;

FIGS. 12A to 12C are pictorial representations used to explain a manner in which pictures on the monitor are changed when a predetermined program is selected;

DETAILED DESCRIPTION OF THE PREFERRED EMBODIMENT

The present invention will hereinafter be described with reference to the drawings.

Figure 1A:
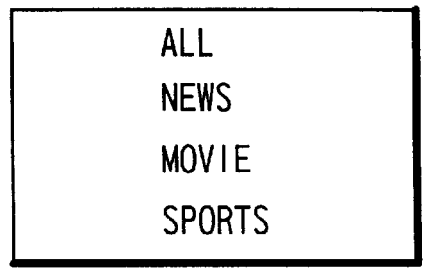
FIG. 1A is a schematic diagram showing an example of genre selection picture in the electronic program guide (EPG)
Figure 1B:
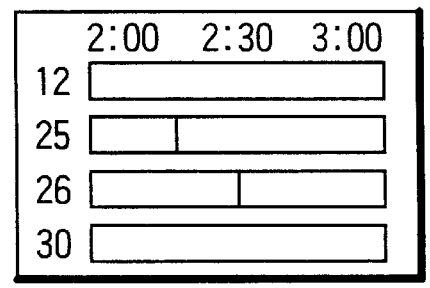
FIG. 1B is a schematic diagram showing an example of a program list picture in the EPG.
Figure 2:
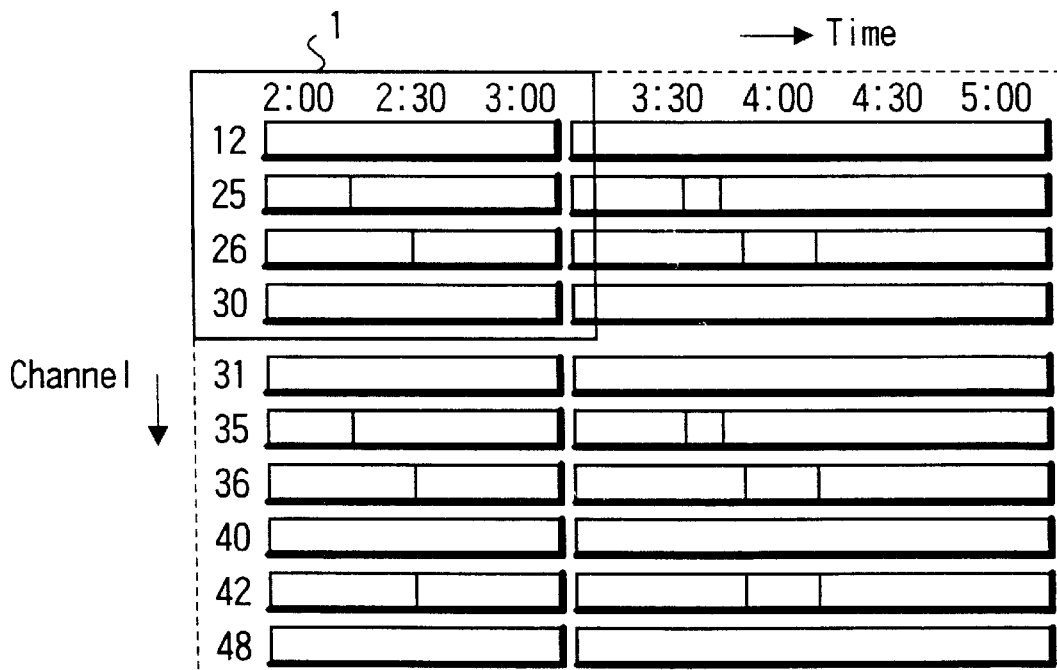
FIG. 2 is a schematic diagram showing the program list picture shown in FIG. 1B more in detail.
Figure 3:
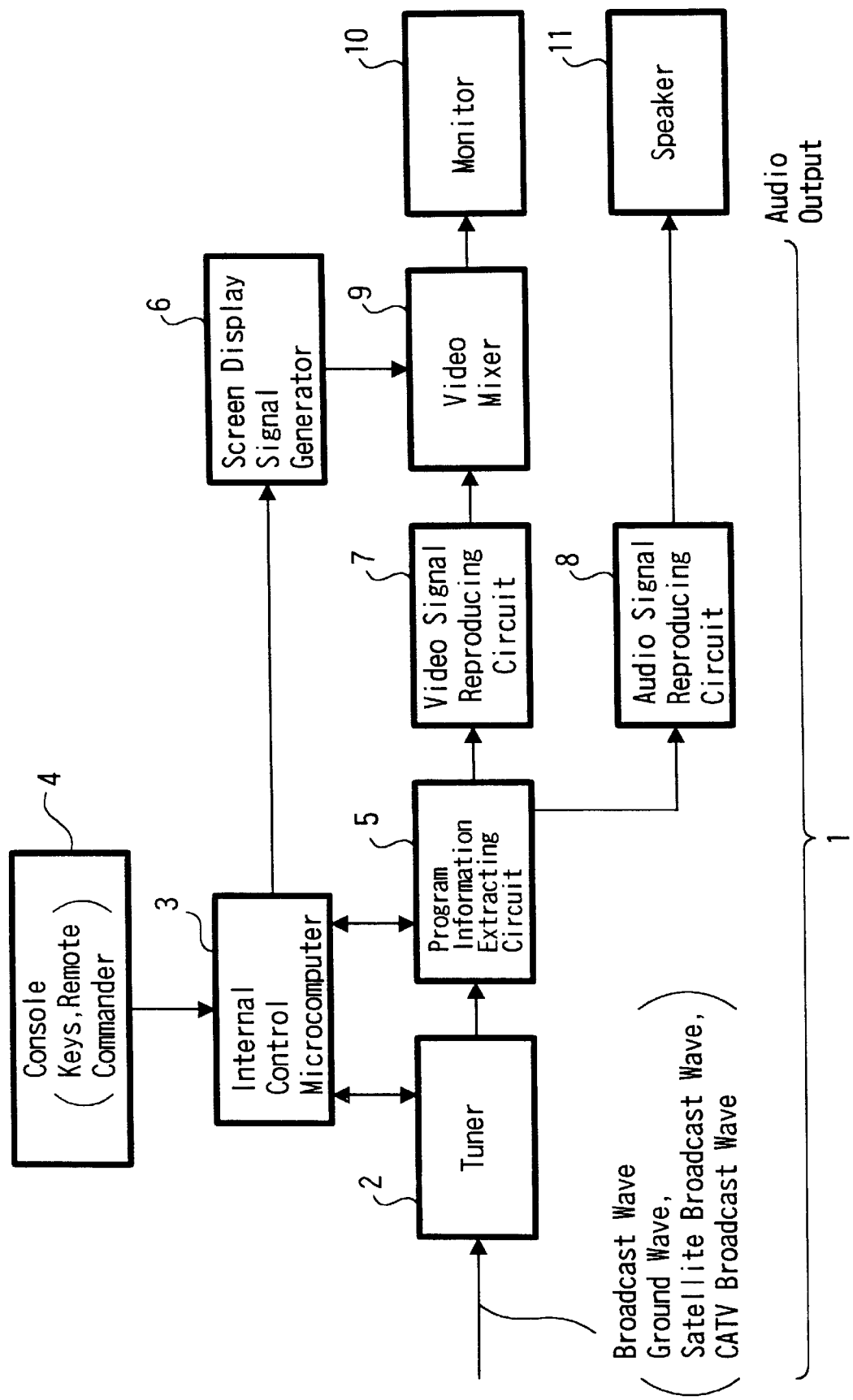
FIG. 3 is a block diagram showing an electronic program guide display control apparatus according to the present invention.

FIG. 3 is a block diagram showing an electronic program guide display control apparatus according to the present invention. In an electronic program guide display control apparatus (IRD) 1 according to the present invention, a broadcast wave received at an antenna (not shown) is inputted to a tuner 2. Data of program information (EPG data) is superimposed upon this broadcast wave.

The broadcast wave may be any one of ground wave, satellite broadcast wave and CATV broadcast wave. The inside arrangement of the tuner 2 is changed with the kind of received broadcast wave such as analog signal or digital signal.

The tuner 2 carries out tuning in response to control done by an internal control microcomputer 3 which controls the whole of this apparatus. An output of the tuner 2 is supplied to a program information extracting circuit 5. Incidentally, the output from the tuner 2 contains the above-mentioned program information in addition to video and audio information.

The internal control microcomputer 3 controls the tuner 2, the program information extracting circuit 5 and a screen display signal generator 6 in response to operation commands from a console 4 operated by the user. In this case, the console 4 is composed of operation keys provided on the apparatus body or a remote commander 4A shown in FIG. 7. The inside arrangement of this internal control microcomputer 3 will be described more fully with reference to FIG. 4.

The program information extracting circuit 5 extracts program information data from the output of the tuner 2 and supplies the thus extracted program information data to the internal control microcomputer 3. The program information data is converted into display screen image data (screen display data) and supplied to the screen display signal generator 6.

Video data and audio data of the output inputted to the program information extracting circuit 5 from the tuner 2 are respectively supplied to a video signal reproducing circuit 7 and an audio signal reproducing circuit 8.

The screen display signal generator 6 generates a program information image signal (screen display signal) based on image data of screen display data (program information data) supplied from the internal control microcomputer 3 and supplies the thus generated program information image signal to a video mixer 9.

The video signal reproducing circuit 7 reproduces video data supplied from the program information extracting circuit 4 to the video signal and supplies the video signal to the video mixer 9.

The video mixer 9 mixes the video signal supplied from the video signal reproducing circuit 7 and the program information image signal (screen display signal) supplied from the screen display signal generator 6 and outputs a mixed signal to a monitor (television receiver) 10 as a video output.

Similarly, the audio signal reproducing circuit 8 reproduces the audio data supplied from the program information extracting circuit 5 to audio data and outputs the audio signal (audio output) to a speaker 11.

Figure 4:
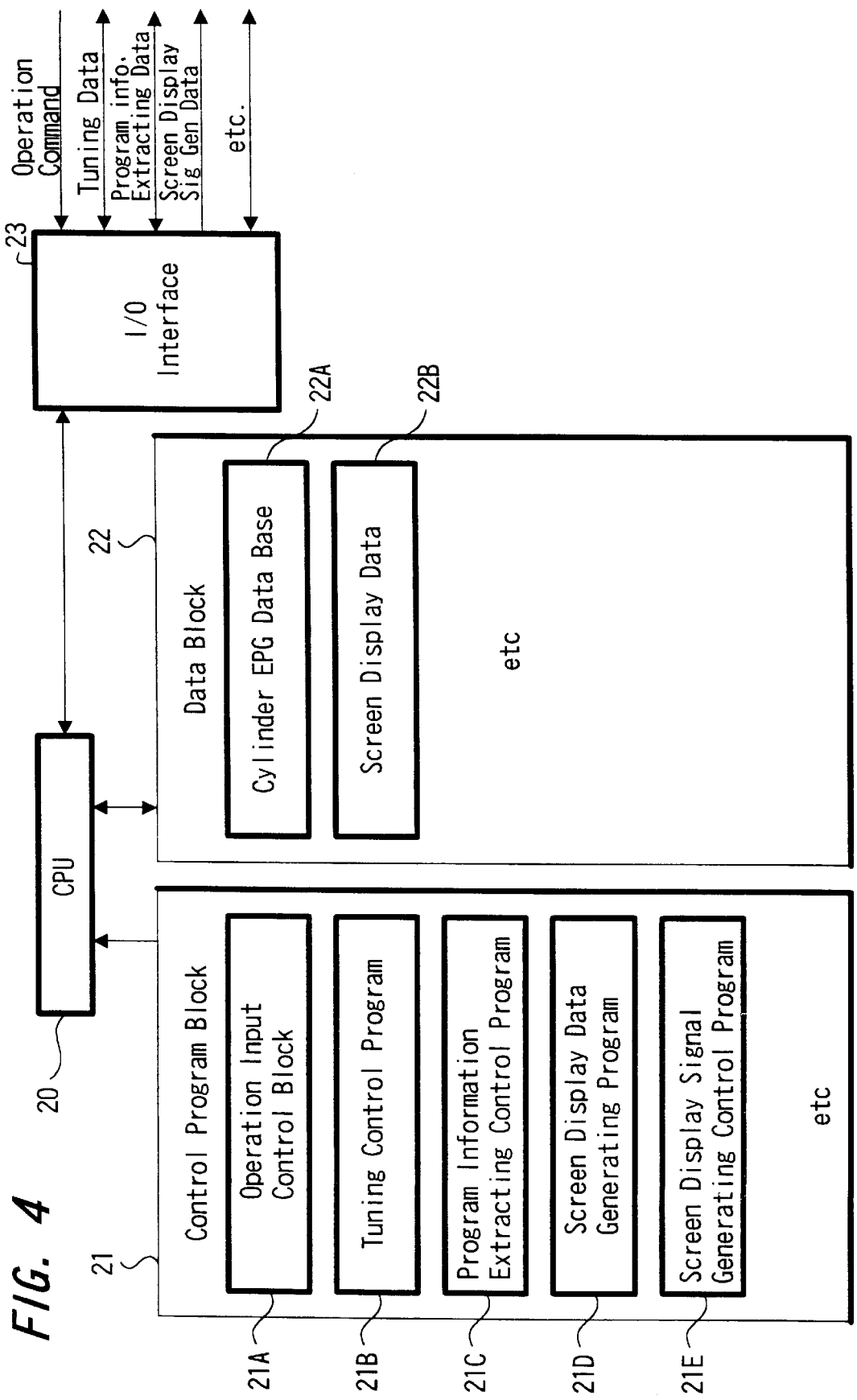
FIG. 4 is a block diagram showing an inside arrangement of an internal control microcomputer 3 shown in FIG. 3.

The inside arrangement of the internal control microcomputer 3 shown in FIG. 3 will be described with reference to FIG. 4. As shown in FIG. 4, operation commands or data from the console 4, the tuner 2 and the program information extracting circuit 5 are inputted through an I/O (input/output) interface 23 to a CPU 20 (central processing unit) 20.

The CPU 20 carries out various processing based on a variety of programs contained in a control program block 21 in response to data or operation commands inputted thereto from the I/O interface 23.

The control program block 21 contains the following programs. Specifically, an operation input control program 21A is a program for executing a processing corresponding to the operation command inputted from the console 4. A tuning control program 21B is a program used to control a tuning processing of the tuner 2 and to decide tuning results.

A program information extracting control program 21C is a program used to control the processing in which the program information extracting circuit 5 extracts program information. A screen display data generating program 21D is a program used to generate screen display data of program information based on the program information data supplied from the program information extracting circuit 5. A screen display signal generating control program 21E is a program used to control the processing of the screen display signal generator 6.

A variety of storage areas are set in the data block 22 in which cylinder EPG database 22A and screen display data 22B are stored. The cylinder EPG database 22A is database of cylinder EPG which will be described later on with reference to FIGS. 5 and 6. The screen display data 22B is generated by executing the screen display data generating program 21D and is screen display data of cylinder EPG written in a VRAM (video Random-Access Memory) of the data block 22.

Figure 5:
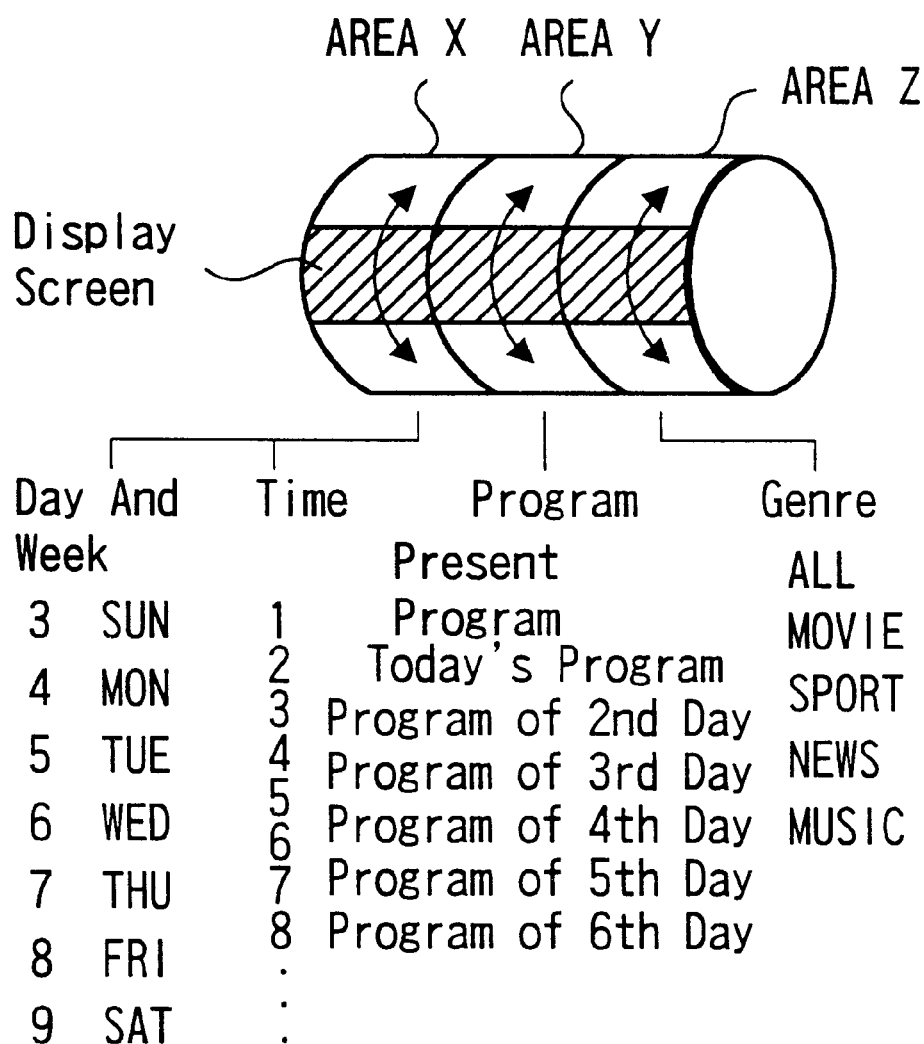
FIG. 5 is a conceptual diagram of an electronic program guide according to the present invention.

The manner in which the EPG generated by the electronic program guide display apparatus according to the present invention is displayed on the display screen of the monitor 10 serving as the display apparatus will be described below. FIG. 5 is a conceptual diagram of the EPG according to the present invention. As shown in FIG. 5, in the EPG according to the present invention, a circumferential surface of a cylinder corresponding to a picture screen (display screen) of the monitor 10 is divided into three areas (areas X, Y, Z) along the horizontal central axis in the vertical direction (i.e., the picture screen of the display apparatus is divided along the longitudinal direction). The three areas X, Y, Z are classified as follows.

Specifically, on the area X (date display means) which is disposed at the leftmost side of the three areas of the cylinder are arranged days of week, day of week and time in the longitudinal direction (circumferential direction) in the sequential order.

On the area Y (title display means) disposed at the center of the three areas X, Y, Z, are arranged titles of programs now being broadcast or future programs along the longitudinal direction (circumferential direction) not only in the sequential order of channel number but also in the sequential order of broadcast starting time.

In the area Z (genre display means) disposed at the rightmost position of the three areas X, Y, Z, there are arranged program genres (e.g., "ALL", "MOVIE", "SPORT", "NEWS", "MUSIC", etc.) in the longitudinal direction (circumferential direction).

The user can rotate the respective areas X, Y, Z by operating the console 4 (e.g., the remote commander 4A in FIG. 7) and display desired information on a display screen shown hatched in FIG. 5.

As described above, in the EPG according to the present invention, the cylinder is divided into a plurality of areas, days, programs and genres are assigned to the respective areas and the respective areas are made rotatable. In this specification, the EPG displayed in this state will be referred to as "cylinder EPG".

Figure 6:
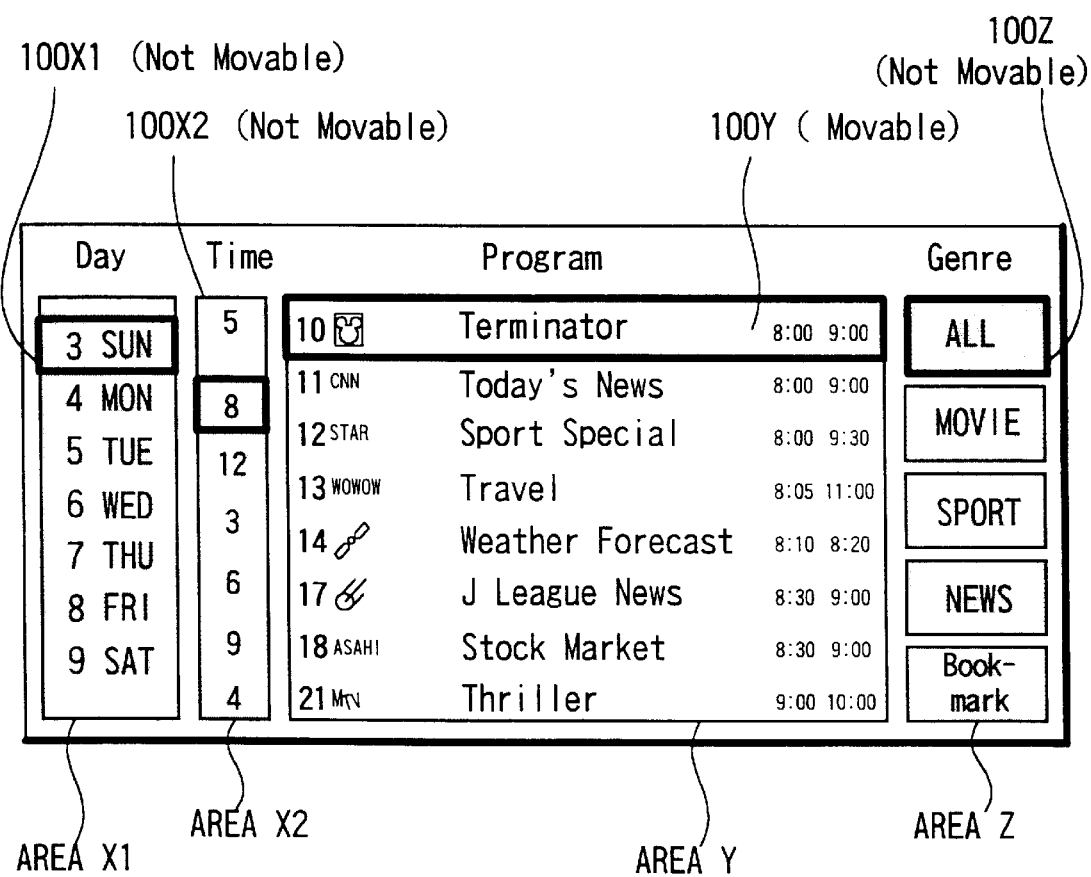
FIG. 6 is a pictorial representation illustrating a manner in which a cylinder EPG is displayed on the screen of a monitor in actual practice.

FIG. 6 is a schematic diagram showing an example of a displayed picture on the monitor 10 of the cylinder EPG shown in FIG. 5. In FIG. 6, the area in which date and day are displayed and the area in which time is displayed are further provided. The area in which date and day are displayed is set to an area X1 and the area in which time is displayed is set to an area X2.

When the user operates the console 4 or the like, movable cursors, i.e., designating means (cursor 100X1 of the area X1, cursor 100X2 of the area X2, cursor 100Y of the area Y and cursor 100Z of area Z) are displayed on the respective area X1, X2, Y, Z.

As shown in FIG. 6, for example, in the area X1 in which date is displayed, the cursor 100X1 is placed at "3" (i.e., Sunday, 3). In the area X2 in which time is displayed, the cursor 100X2 is placed at 8:00, a.m. In the area X2, numeral (in this case, "8") of time on which the cursor 100X2 is placed is displayed larger than the numerals indicating other times. Incidentally, in the area X2, there are displayed time of one day from 5:00 a.m. (5:00) to 4:00 a.m. (4:59).

In the area Z on which genre is displayed, the cursor 100Z is placed at "ALL". In the area Y (the cursor 100Y is placed at "TERMINATOR"), there are displayed program titles of all genres broadcast on 8:00 a.m. of Sunday 3 together with channel numbers, station logotypes and broadcasting times. The programs that are displayed on the area Y are those following the programs that are now being broadcast.

The user can rotate (scroll) the respective areas by moving the cursors 100X1, 100X2, 100Y, 100X.

Figure 7:
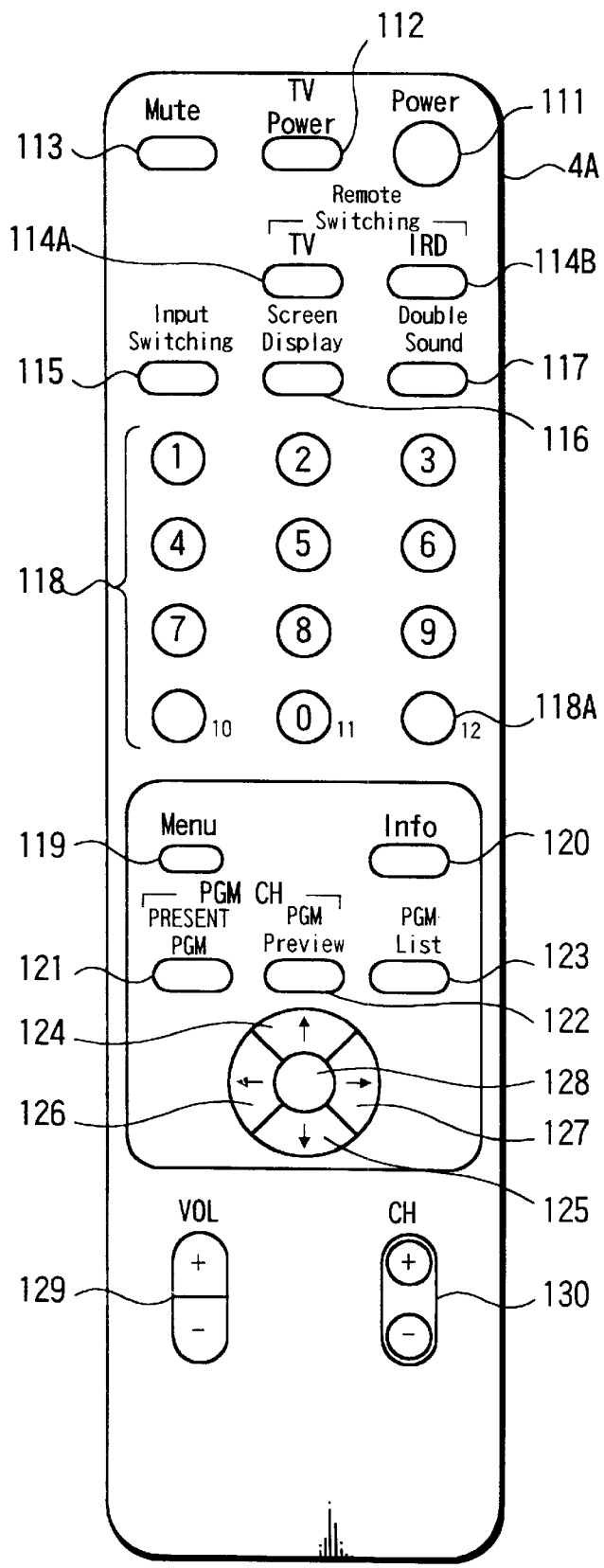
FIG. 7 is a plan view illustrative of a remote commander operated by a user.

The arrangement of the console 4 shown in FIG. 3 will be described below with reference to FIG. 7. FIG. 7 is a plan view showing the remote commander used when the user operates the electronic program guide display control apparatus according to the present invention in a remote-control fashion. In other words, this remote commander 4A is the console 4 shown in FIG. 3.

The power-supply button switches 111 and 112 are pressed to energize or deenergize the monitor 10 or the electronic program guide display control apparatus (IRD) 1.

When the user presses a mute button switch 113, sounds are muted. When the user presses the mute button switch 113, sounds are released from being muted.

A television switch button switch 114A and an IRD switch button switch 114B are used to change-over the functions of respective switches of the remote commander 4A to those corresponding to the monitor 10 or those corresponding to the electronic program guide display control apparatus 1.

An input change-over button switch 115 is pressed when an input to the electronic program guide display control apparatus 1 is changed-over. A picture display button switch 116 is pressed in order to display channel numbers (containing station logotypes and title names) on the monitor 10. When this picture display button switch 116 is pressed again, channel numbers, etc., displayed on the monitor are erased. A double-sound button switch 117 is pressed in order to switch sounds emanated from the speaker 11 to main sounds, sub-sounds, main+sub-sounds (foreign language or Japanese and foreign language) in the program of bilingual broadcasting or multiplex broadcasting.

A numeral button switch 118 with numerals ranging from 0 to 9 disposed thereon is pressed in order to input a desired numeral button. A channel-selection button switch 118A is depressed after depression of the numeral button switch 118 was ended in order to indicate the end of input of numeral and that inputted numeral indicates the channel when depression of the numeral button switch 118 is completed.

When the television change-over switch 114A is operated and the remote commander 4A is used as the remote commander for the monitor 10, a button disposed under the button "7" of the numeral button switch 118 is a button indicating "10", a button "0" serves as a button indicating "11", and the channel-selection button switch 118 serves as a button indicating "12". The monitor 10 displays a program of broadcasting station (channel) thus set to the pressed button.

A menu button switch 119 is depressed in order to display menu pictures (not shown) of various setting data such as electronic program guide or IRD on the monitor 10. An info (information) button switch 120 is depressed in order to display info screens (not shown).

A present program button switch 121 and a program preview button switch 122 are used to select promotion channels and pressed when a program that is not being broadcast or a preview or future program to be broadcast is displayed. A program list button switch 123 is depressed when the EPG (program list) shown in FIG. 6 is displayed.

A select button (decide key) switch 128 can be pressed (select operation) in the vertical direction relative to the upper surface of the remote commander 4A. An up-button switch (up key) 124, a down-button switch (down key) 125, a left-button switch (left key) 126 and a right-button switch (right key) 127 are pressed in order to move the cursors (e.g., cursors 100X1, 100X2, 100Y, 100Z shown in FIG. 6) displayed on the screen upper, lower, left and right.

A volume button switch 129 and a channel up and down button switch 130 are pressed in order to increment or decrement volume or channel number.

Operation of the electronic program guide display control apparatus according to the present invention will be described with reference to flowcharts of FIGS. 8 and 9.

Initially, the CPU 20 executes a processing corresponding to a variety of commands entered by the remote commander 4A (console 4) by executing the operation input control program 21A.

Figure 8:
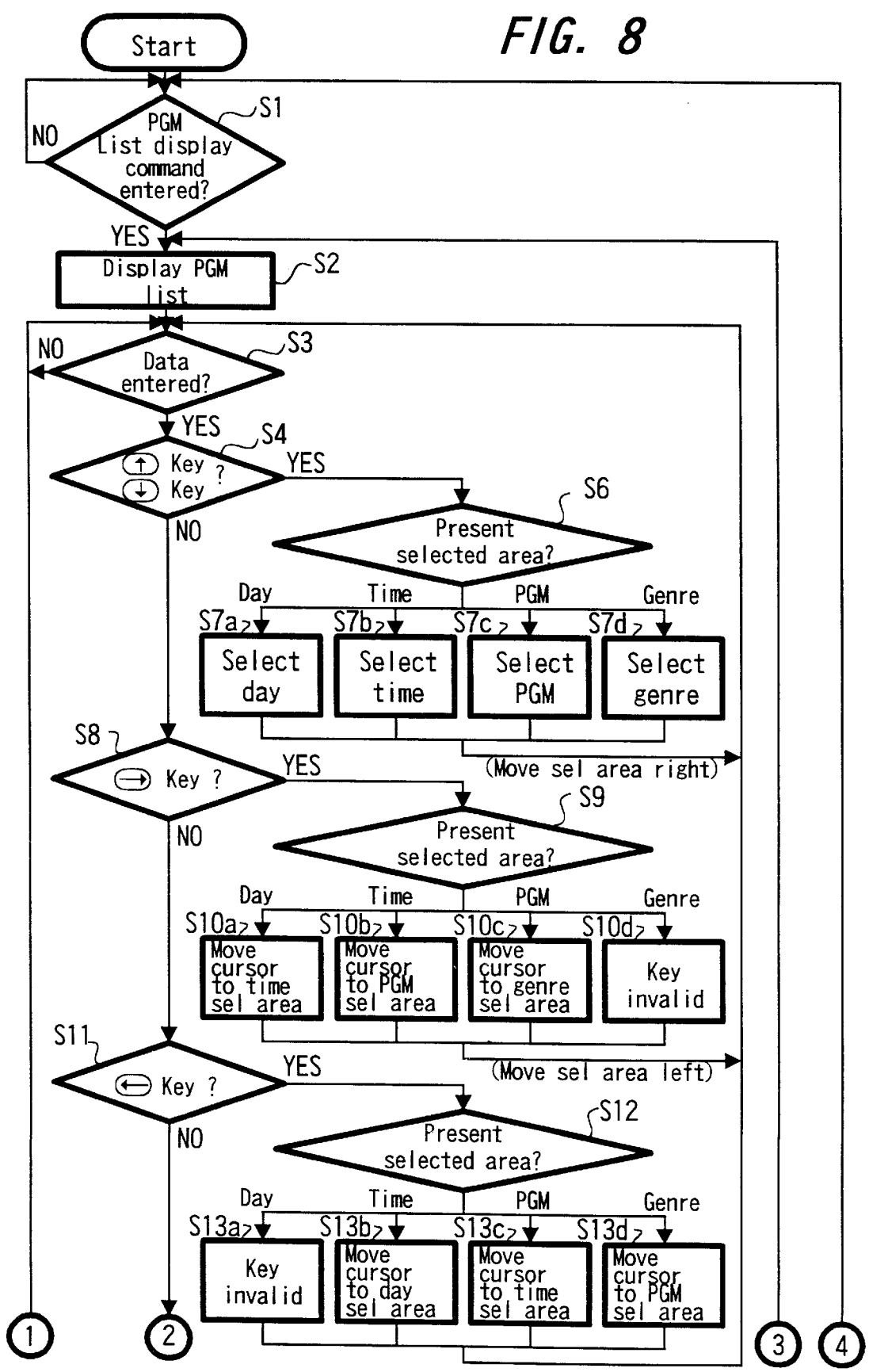
FIGS. 8 and 9 are flowcharts to which reference will be made in explaining operation of the electronic program guide display control apparatus shown in FIG. 3.

Following the start of operation, it is determined in a decision step S1 in FIG. 8 by the CPU 20 of the internal control microcomputer 3 whether or not the program list button switch 123 of the remote commander 4A (console 4) is depressed.

If a command for selecting a predetermined channel is inputted during that period, then the CPU 20 executes the tuning control program 21B in response to the operation command inputted thereto through the I/O interface 23 to control the tuning processing of the tuner 2. A broadcast wave is supplied through an antenna or the like to the tuner 2, whereby the tuner 2 executes the tuning processing corresponding to the control of the internal control microcomputer 3 (CPU 20) and supplies a received output of a designated channel to the program information extracting circuit 5.

Program information data of a week are superimposed upon the broadcast wave supplied to the tuner 2 once per several seconds. The program information data is updated into latest data once per three hours. The output supplied from the tuner 2 to the program information extracting circuit 5 contains the program information data.

The CPU 20 of the internal control microcomputer 3 controls the processing of the program information extracting circuit 5 by executing the program information extracting control program stored in the control program block 21. The program information extracting circuit 5 extracts the program information data from the output of the tuner 2 in response to this control and supplies the thus extracted program information data to the internal control microcomputer 3. The CPU 20 of the internal control microcomputer 3 stores this data in the cylinder EPG database 22A.

The screen display signal generator 6 converts the program list screen display data 22B supplied from the internal control microcomputer 3 into the screen display signal and supplies the thus converted screen display signal to the video mixer 9.

A video signal (video signal indicative of program selected by the tuner 2) outputted from the program information extracting circuit 5 and reproduced by the video reproducing circuit 7 is inputted to the video mixer 9. The video mixer 9 outputs this video signal to the monitor 10, and the audio signal reproduced by the audio signal reproducing circuit 8 is outputted to the speaker 11. In this way, image and sounds of the designated channel are outputted to the monitor 10 and the speaker 11.

The user presses the program list button switch 123 of the remote commander 4A when the user wants to display the program list, for example.

If the program list button switch 123 is not depressed as represented by a YES at the decision step S1, then the step S1 is repeated. If the program list button 123 of the remote commander 4A is pressed as represented by a YES at the decision step S1, then the program list display command is inputted through the I/O interface 23 of the internal control microcomputer 3 to the CPU 20 and control goes to a step S2.

In the step S2, the CPU 20 executes the screen display data generating program 21D and generates the program information screen display data 22B based on the cylinder EPG database 22A stored within the data block 22. This screen display data 22B is stored in the data block 22 and also outputted through the I/O interface 23 to the screen display signal generator 6. Also, the CPU 20 executes the screen display signal generating control program 21E to control the processing of the screen display signal generator 6. In this manner, an EPG (program list) shown in FIG. 10 (c-1) is displayed on the screen of the monitor 10.

Then, control goes to the next decision step S3, in which it is determined by the CPU 20 whether or not any one of the program list button switch 123, the up-button switch 124, the down-button switch 125, the left button switch 126, the right button switch 127 and the select button switch 128 is depressed (it is determined whether or not data is entered by key). If any one of the switches 123 to 127 is not depressed as represented by a NO at the decision step S3, then the decision step S3 is repeated. If on the other hand any one of the switches 123 to 127 is pressed as represented by a YES at the decision step S3, then control goes to the next decision step S4.

It is determined at the decision step S4 whether the depressed switch is the up-button switch 124 or down-button switch 125. If the pressed switch is either the up-button switch 124 or the down-button switch 125 as represented by a YES at the decision step S4, then control goes to the next decision step S6.

It is determined at the decision step S6 by the CPU 20 whether the area in which the movable cursor exists is any one of the areas X1, X2, Y and Z. If the movable cursor is the cursor 100X1 disposed at the area X1 (i.e., area in which date and day are displayed), then control goes to a step S7a, in which the CPU 20 moves the cursor 100X1 of the area X1 (i.e., area in which date and day are displayed) up or down in response to the operation of the up-button switch 124 or the down-button switch 125. Thus, date and day are selected.

As shown in FIG. 10 (a-1), for example, when the cursor 100X1 existing in the area X1 (area in which date and day are displayed) is movable and the cursor 100X1 is place at 3, Sunday, if the down-button switch 125 is depressed once, as shown in FIG. 10 (a-2), the cursor 100X1 is moved to 4, Monday (i.e., just below 3, Sunday).

If it is determined at the decision step S6 that the movable cursor is the cursor 100X2 placed at the area X2, then control goes to a step S7b, whereat the CPU 20 moves the cursor 100X2 of the area X2 (i.e., area in which time is displayed) up or down in response to the up-button switch 124 or down-button switch 125 to thereby select time.

As shown in FIG. 10 (b-1), for example, when the cursor 100X2 existing on the area X2 is movable and the cursor 100X2 is placed at 8:00 a.m., if the down-button switch 125 is depressed once, then as shown in FIG. 10 (b-2), the cursor 100X2 is moved to 9:00 a.m. (i.e., just below 8:00 a.m.).

If it is determined at the decision step s6 that the movable cursor is the cursor 100Y placed at the area Y, then control goes to a step S7c, whereat the cursor 100Y of the area Y (i.e., area in which title of program, etc., are displayed) is moved up or down in response to the depression of the up-button switch 124 or the down-button switch 125 to select the program.

As shown in FIG. 10 (c-1), for example, when the cursor 100Y of the area Y is movable and the cursor 100Y is placed at "TERMINATOR" of channel 10, if the down-button switch 125 is pressed once, then as shown in FIG. 10 (c-2), the cursor Y is moved to "TODAY'S NEWS" of channel 11 (i.e., program just below "TERMINATOR").

If it is determined at the decision step S6 that the movable cursor is the cursor 100Z placed at the area Z, then control goes to a step S7d, whereat the cursor 100Z of the area Z (i.e., area in which name of genre is displayed) is moved up or down in response to the depression of the up-button switch 124 or the down-button switch 125 to select the genre.

As shown in FIG. 10 (d-1), for example, when the cursor 100Z existing on the area Z is movable and placed at "ALL", if the down-button switch 125 is depressed once, then as shown in FIG. 10 (d-2), the cursor 100Z is moved to "MOVIE" (i.e., genre located just below "ALL").

In the respective steps 7a through 7d (changing means), if a cursor in a predetermined area is moved up or down, then the cursor is moved and the display of other area is changed in response to the movement of the cursor. This operation will be described below.

The manner in which the display of other area is changed when the cursor 100Y of the area Y is moved up or down will be described below. FIGS. 11A through 11D show the manner in which the display of other area is changed when the cursor 100Y of the area Y is further moved down. FIG. 11A shows the same picture as that of FIG. 10 (c-2). Under this state, if the down-button switch 125 is depressed six times, the cursor 100Y of the area Y is moved from "TODAY'S NEWS" of channel 11 to "THRILLER" of channel 21 displayed in the sixth row from "TODAY'S NEW" in response to the depression of the down-button switch 125 (see FIG. 11B). Since the broadcast time of this program ("THRILLER") is from 9:00 a.m., to 10:00 a.m., the cursor 100X2 of the area X2 placed at 8:00 a.m. is moved to 9:00 a.m. (see FIG. 11B).

In the state shown in FIG. 11B, if the area Y is scrolled up by depressing the down-button switch 125 and the cursor 100Y is placed at a program 4F broadcast from 5:30 a.m. to 6:00 a.m. (the next day, i.e., 4 Monday), then the cursor 100X1 of the area X1 (area in which date and day are displayed) is moved to 4 Monday and the cursor 100X2 of the area X2 is moved to 5:00 a.m. In other words, the cursor of the area Y is placed at the program whose broadcasting is started after 00:00 a.m., then the cursor of the area X1 is moved by an amount of one day.

After the selection of the items displayed on the respective areas of the steps S7a to S7d has been ended, control goes back to the decision step S3, in which it is determined whether or not new data is entered by key.

If on the other hand the key depressed by the user is neither the up-button switch 124 nor the down-button switch 125 as represented by a NO at the decision step S4, then control goes to the next decision step S8. It is determined at the decision step S8 whether or not the key pressed by the user is the right button switch 127. If the key is the right button switch 127 as represented by a YES at the decision step S8, then control goes to the next decision step S9.

It is determined at the decision step S9 whether the area (selected area) in which the movable cursor exists is any one of the areas X1, X2, Y, Z. If the area is the area X1 (i.e., area in which date and day are displayed), then control goes to a step S10a. In the step S10a, the area in which the movable cursor exists is moved from the area X1 to the area X2 (area adjacent to the area X1 in the right-hand side) (time display area) (i.e., cursor 100X2 becomes movabale).

Specifically, as shown in FIG. 10 (a-1), when the cursor 100X1 of the area X1 is movable, if the right button switch 127 is depressed once, then the area in which the movable cursor exists is moved to the area X2 shown in FIG. 10 (b-1). Incidentally, the cursor that is movable at present is displayed most bold.

If it is determined at the decision step S9 that the area (selected area) in which the movable cursor exists is the area X2, then control goes to a step S10b, whereat the area in which the movable cursor exists is moved from the area X2 to the area Y (area adjacent to the area X2 in the right-hand side) (area in which title of program, etc., are displayed) (cursor 100Y becomes movable).

Specifically, as shown in FIG. 10 (b-1), when the cursor 100X2 of the area X2 is movable, if the right button switch 127 is depressed once, the area in which the movable cursor exists is moved to the area Y shown in FIG. 10 (c-1).

If it is determined at the decision step S9 that the area (selected area) in which the movable cursor exists is the area Y, then control goes to a step S10c, whereat the area in which the movable cursor exists is moved from the area Y to the area Z (area adjacent to the area Y in the right-hand side) (genre display area) (cursor 100Z becomes movable).

Specifically, as shown in FIG. 10 (c-1), when the cursor 100Y of the area Y is movable, if the right button switch 127 is depressed once, then the area in which the movable cursor exists is moved to the area Z as shown in FIG. 10 (d-1).

If it is determined at the decision step S9 that the area (selected area) in which the movable cursor exists is the area Z, then control goes to a step S10d, whereat the data entered by the key is made invalid (because a predetermined area is not disposed adjacent to the area Z in the right-hand side).

After the steps S10a through S10d have been ended, control goes back to the decision step S3, whereat it is determined whether or not data is entered by key.

If on the other hand the key pressed by the user is not the right button switch as represented by a NO at the decision step S8, then control goes to a decision step S11. In the decision step S11, it is determined whether the key pressed by the user is the left button switch 126. If the key pressed by the user is the left button switch 126 as represented by a YES at the decision step S11, then control goes to the next decision step S12. In the decision step S12, it is determined whether the area (selected area) in which the movable cursor exists is the areas X1, X2, Y, Z.

If it is determined at the decision step S12 that the area in which the movable cursor exists is the area X1, then control goes to a step S13a, whereat the data entered by the key is made invalid (because a predetermined area is not disposed adjacent to the area X1 in the left-hand side).

If it is determined at the decision step S12 that the area (selected area) in which the movable cursor exists is the area X2, then control goes to a step S13b, whereat the area in which the movable cursor exists is moved from the area X2 to the area X1 (area disposed adjacent to the area X2 in the left-hand side) (cursor 100X1 becomes movable).

Specifically, as shown in FIG. 10 (b-1), when the cursor 100X2 of the area X2 is movable, if the left button switch 126 is pressed once, then the area in which the movable cursor exists is moved to the area X1 shown in FIG. 10 (a-1).

If it is determined at the decision step S12 that the area in which the movable cursor exists is the area Y, then control goes to a step S13c, whereat the area in which the movable cursor exists is moved from the area Y to the area X2 (area disposed adjacent to the area Y in the left-hand side) (cursor 100X2 becomes movable).

Specifically, as shown in FIG. 10 (c-1), when the cursor 100Y of the area Y is movable, if the left button switch 126 is depressed once, then the area in which the movable cursor exists is moved to the area X2 shown in FIG. 10 (b-1) (cursor 100X2 becomes movable).

If it is determined at the decision step S12 that the area in which the movable cursor exists is the area Z, then control goes to a step S13d, whereat the area in which the movable cursor exists is moved from the area Z to the area Y (area disposed adjacent to the area Z in the left-hand side).

Specifically, as shown in FIG. 10 (d-1), when the cursor 100Z of the area Z is movable, if the left button switch 126 is depressed once, then the area in which the movable cursor exists is moved to the area Y shown in FIG. 10 (c-1) (cursor 100Y becomes movable).

After the steps S13a through 13d have been ended, control goes back to the decision step S3, whereat it is determined whether or not data is entered by key.

Figure 9:
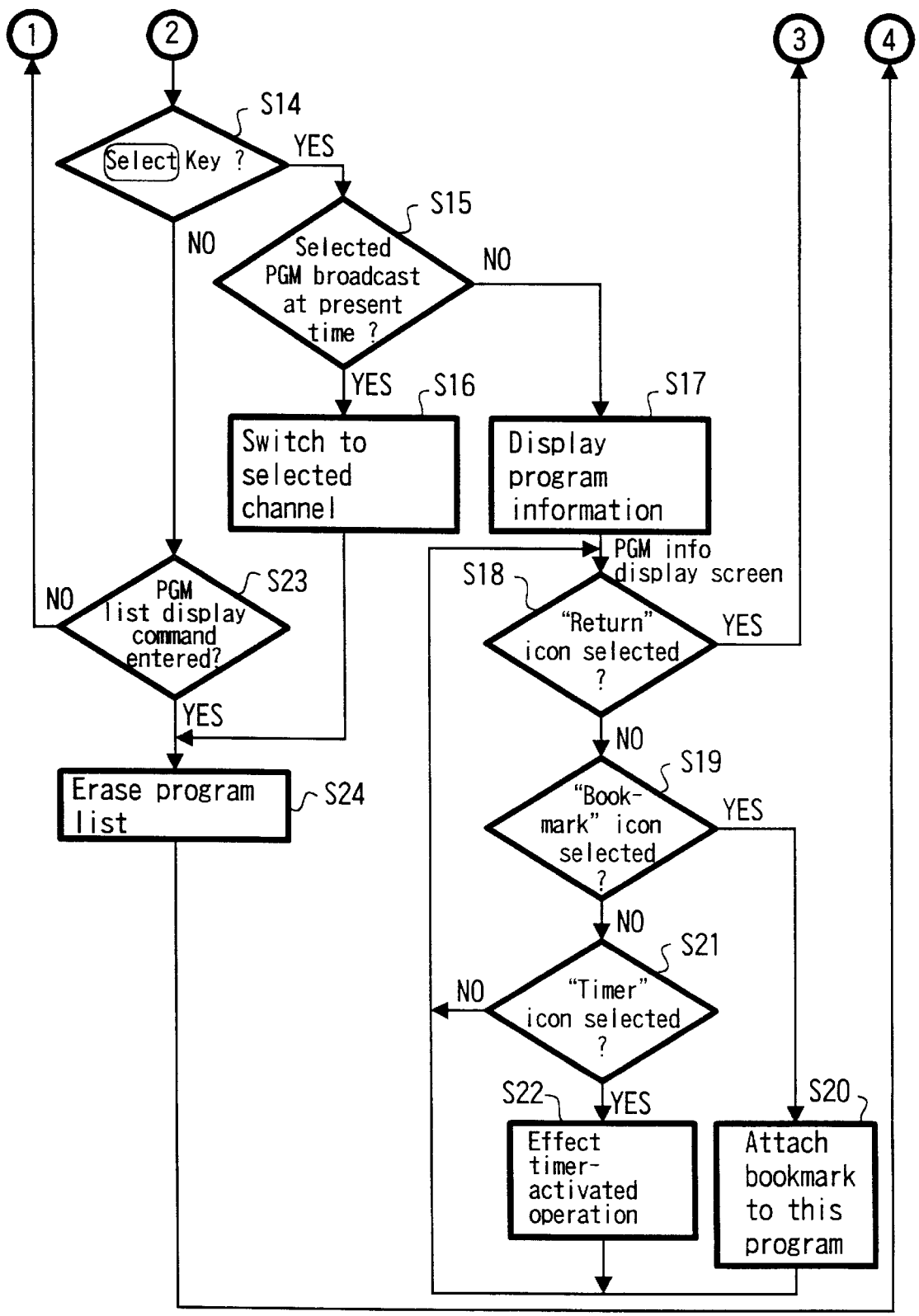

If on the other hand the key pressed by the user is not the left button switch 126 as represented by a NO at the decision step S11, then control goes to the next decision step S14 shown in FIG. 9. It is determined at the decision step S14 whether or not the key pressed by the user is the select button switch (decide key) 128. If the key pressed by the user is the select button switch 128 as represented by a YES at the decision step S14, then it is recognized that the program at which the cursor 100Y of the area Y is placed is selected. Then, control goes to the next decision step S15.

It is determined at the decision step S15 whether or not the program selected at the step S14 is now being broadcast. If such program is broadcast as represented by a YES at the decision step S15, then control goes to a step S16, whereat the picture on the monitor 10 is switched to a program selected from the cylinder EPG. Specifically, the CPU 20 controls the tuner 2 to receive the channel of the designated program, and hence an image of the designated program is displayed on the monitor 10. Then, at that time, the program list that has been displayed so far is erased at a step S24.

If on the other hand the selected program is not broadcast at present and a future program to be broadcast as represented by a NO at the decision step S15, then control goes to a step S17, whereat the display of picture on the monitor 10 is switched to program information of the program selected from the cylinder EPG. Specifically, the CPU 20 reads out program information (e.g., plot, casting, etc., of the program) of the program from the cylinder EPG database 22 and displays the thus read out program information.

The steps S15 to S17 will be described more fully with reference to FIGS. 12A, 12B and 12C. Incidentally, it is assumed that the present day and time is 3, Sunday and 8:10 a.m.

On the screen of the monitor 10 is displayed the cylinder EPG shown in FIG. 12A (which is the same as the program list shown in FIG. 10 (c-1) but the cursor 100Y of the area Y is not shown). For example, if the user places the cursor 100Y at "TRAVEL" of channel 13 (broadcast from 8:05 a.m. to 11:00 a.m.) by operating the remote commander 4A and presses the select button switch 128, then because the selected program ("TRAVEL") is now being broadcast, the picture on the monitor 10 is switched from the cylinder EPG shown in FIG. 12A to the picture of "TRAVEL" shown in FIG. 12B (step S16), and the user can watch the selected program.

On the other hand, if the user places the cursor on "THRILLER" of channel 21 (broadcast from 9:00 a.m. to 10:00 a.m.) by operating the remote commander 4A and presses the select button switch 128, then because the selected program ("THRILLER") is not broadcast at present and is a future program to be broadcast, the picture of the monitor 10 is switched from the cylinder EPG shown in FIG. 12A to the program information of "THRILLER" shown in FIG. 12C.

On the display screen of the program information shown in FIG. 12C are displayed broadcast date, broadcast contents, etc., of that program (in this case, "THRILLER") and a variety of command icons that the user can select. As shown in FIG. 12C, as command icons there are displayed "RETURN" icon for displaying the program list (FIG. 12A) one more time, "BOOKMARK" icon for attaching a bookmark to the program of program information that is now being displayed, "TIMER" icon for receiving and displaying this program on the exact broadcast starting time in a time-activated fashion, and "PURCHASE" icon (not used in this embodiment) used in a so-called television shopping.

The user can place the cursor on a desired command icon by operating the up-button switch 124 and the down-button switch 125 of the remote commander 4A. Then, the user can select the command icon designated by the cursor by pressing the select button switch (decide key) 128.

After the program information shown in FIG. 12C, for example, is displayed at the step S17, control goes to the next decision step S18, whereat it is determined whether or not the "RETURN" icon is selected. If the "RETURN" icon is selected as represented by a YES at the decision step S18, then control goes back to the step S21 whereat the cylinder EPG is displayed on the screen of the monitor 10. If on the other hand the "RETURN" icon is not selected as represented by a NO at the decision step S18, then control goes to the next decision step S19. It is determined at the decision step S19 whether or not the "BOOKMARK" icon is selected.

If the "BOOKMARK" icon is selected as represented by a YES at the decision step S19, then control goes to a step S20, whereat the bookmark is attached to the program introduced by this program information and this program is registered on the bookmark list in the data block 22. After the step S19 has been ended, control goes back to the decision step S18.

If the cursor 100Z is placed at the bookmark icon of the area Z, then the list of program checked (attached with the bookmark) at the step S20 can be displayed on the area Y.

If on the other hand the "BOOKMARK" icon is not selected as represented by a NO at the decision step S19, then control goes to the next decision step S21. It is determined at the decision step S21 whether or not the "TIMER" icon is selected. If the "TIMER" icon is selected as represented by a YES at the decision step S21, then control goes to a step S22, whereat a timer-activated processing of this program introduced by this program information (processing for registering this program on a timer-activated list in the data block 22 for displaying the broadcast starting time) is executed, and control goes back to the decision step S18. If on the other hand the "TIMER" icon is not selected as represented by a NO at the decision step S21, then control goes back to the decision step S18.

In this manner, when the program is registered on the timer-activated list, the clock operation is carried out. When a time reaches the broadcast starting time, the CPU 20 controls the tuner 2 to receive and display the corresponding program.

In this embodiment, since one picture of the monitor 10 is divided into a plurality of areas and date, time, program title, genre, etc., are assigned to respective areas and the user can obtain program information by operating the cursors of the respective areas, the user can obtain desired program information on the same picture screen without being annoyed by the hierarchy.

In the area (area Y) in which the program title is displayed, a number of programs are arranged and displayed in the longitudinal direction in the sequential order of time from the program that is now being broadcast. Therefore, date and time of other area are changed by moving the cursor of that area. Accordingly, the user can easily select a program without designating date and time.

Further, if date, time or genre are changed, then the display of the program title can be changed in accordance with the change of date, time or genre.

Incidentally, the manner in which the program list is displayed may be changed and an example thereof will be described below.

Figures 13, 14:
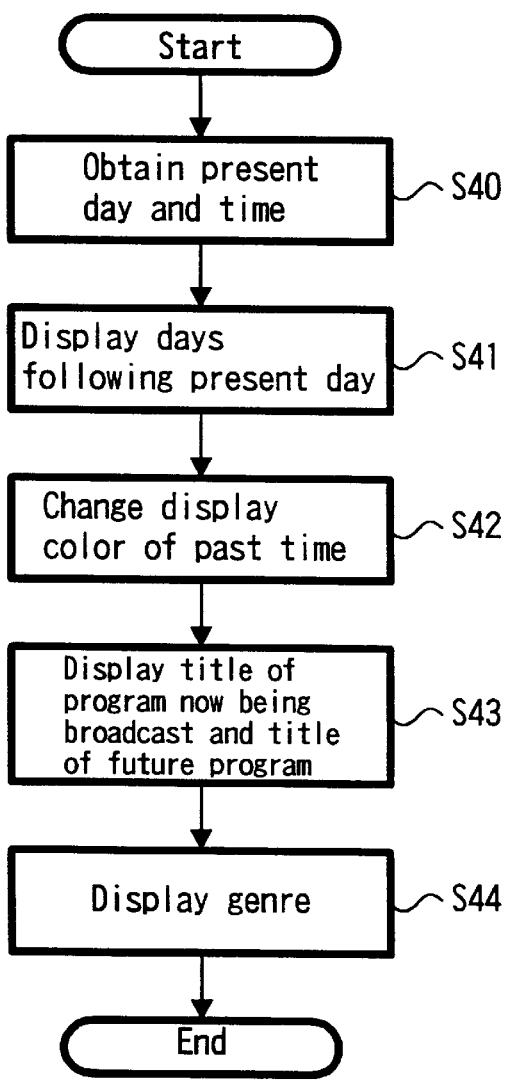
FIG. 13 is a pictorial representation illustrative of other example of a manner in which the cylinder EPG is displayed on the screen of the monitor.
FIG. 14 is a flowchart used to explain a processing for displaying the cylinder EPG shown in FIG. 13.

FIG. 13 is a schematic diagram showing an example in which the manner in which the program list is displayed may be changed. In the program list shown in FIG. 13, a past time and a future time are distinguished and a display color of the portion belonging to the past time is varied.

FIG. 14 is a flowchart to which reference will be made in explaining the manner in which the above-mentioned program list is displayed. FIG. 14 shows the processing executed at the step S2 in the flowchart of FIG. 8 more in detail.

As shown in FIG. 14, following the start of operation, at a step S40, the CPU 20 obtains a present time from a timer (not shown). Then, control goes to the next step S41, whereat dates and days from the present day (day in which the apparatus is energized) are displayed on the area X1. Then, control goes to a step S42, whereat time is displayed in the area X2 and of displayed times, a display color of the portion belonging to the past is changed. Then, control goes to a step S43.

In the step S43, the program that is now being displayed and a future program are displayed on the area Y in the sequential order of channel number. Then, control goes to a step S44, whereat the genre is displayed on the area Z, and the processing is ended.

Assuming now that the present date and time are 3 (Sunday) and 9:00 a.m., then at the step S41, dates following 3 are displayed and at the step S42 the display color of the area before 9:00 a.m. is varied. In the step S43, the program that is now being broadcast and the future program that is to be broadcast are displayed on the area Y. Further, in the step S44, the genre is displayed on the area Z and the processing is ended.

According to the above-mentioned display method, since the program whose broadcasting has already finished is not display any more, unnecessary information can be excluded and the program can be selected more easily.

Figure 15:
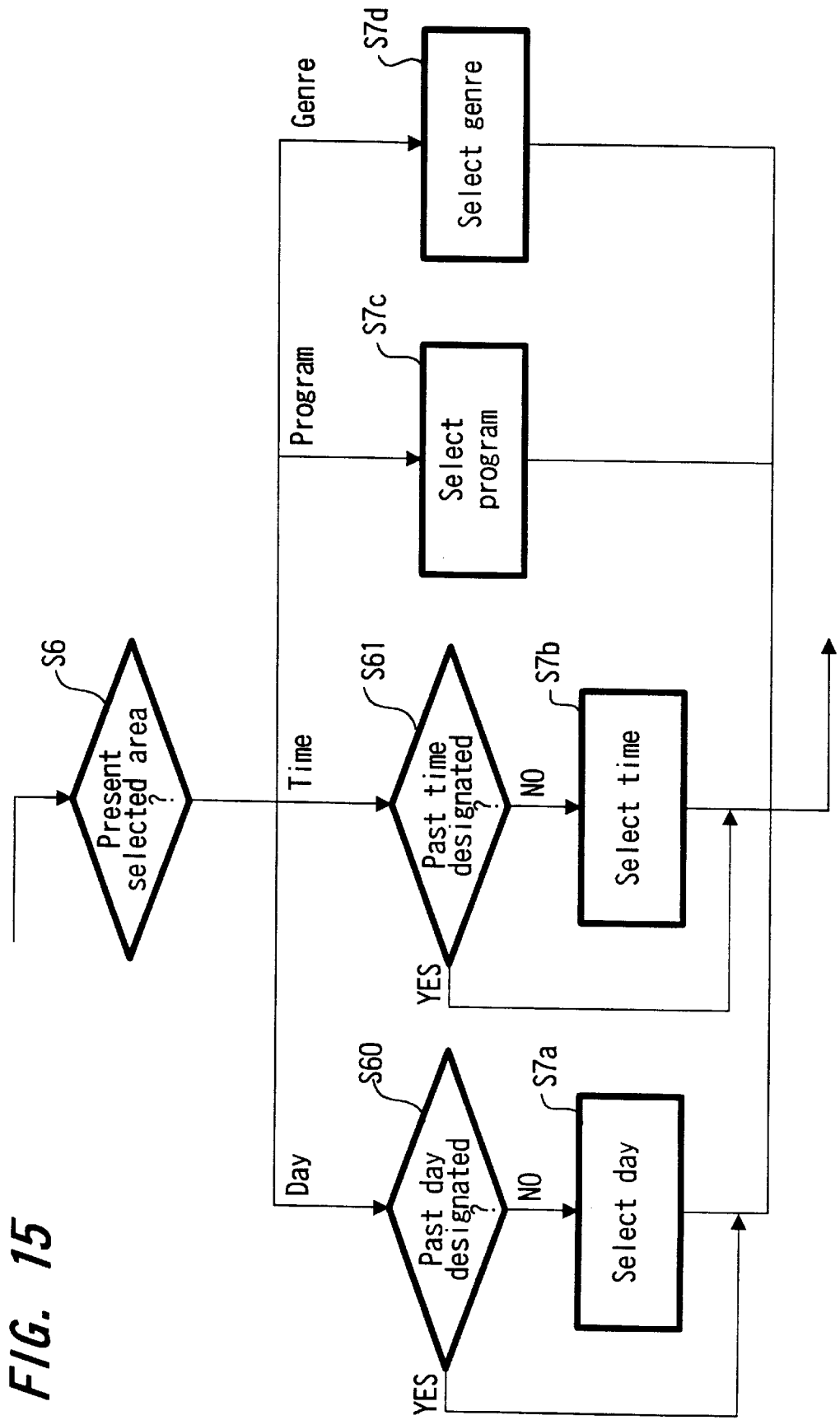
FIG. 15 is a flowchart used to explain an example of a processing executed when the cylinder EPG shown in FIG. 13 is displayed.

FIG. 15 is a flowchart used to explain the processing executed when the displayed example shown in FIG. 14 is displayed. The flowchart shown in FIG. 15 is executed immediately after the step S6 shown in FIG. 8. In FIG. 15, steps identical to those of the flowchart of FIG. 8 are marked with the same references and therefore need not be described.

In the decision step S6, it is determined whether the area in which the movable cursor exists is any one of the areas X1, X2, Y and Z. If it is determined at the decision step s6 that the movable cursor is the cursor 100X1 disposed on the area X1, then control of the CPU 20 goes to a step S60 (inhibiting means). It is determined at the decision step S60 whether or not date that is designated after the cursor 100X1 was moved belongs to the past date. If the date that is designated after the cursor 100X1 was moved is the past date as represented by a YES at the decision step S60, then the step S7a is skipped and control goes back to the step S3, and the processing at the step S3 is repeated. If on the other hand the date that is designated after the cursor 100X1 was moved is not the past date as represented by a No at the decision step s60, then control goes to the step S7a, whereat date and day are selected (i.e., the cursor 100X1 is moved). Then, control goes back to the step S3, and the processing at the step S3 is repeated.

If it is determined at the step S6 that the movable cursor is the cursor 100X2 disposed on the area X2, then control goes to a step S61 (inhibiting means). In the decision step S61, it is determined whether or not time that is designated after the cursor 100X2 was moved belongs to the past time. If the time that is designated after the cursor 100X2 was moved belongs to the past time as represented by a YES at the decision step 561, then the step S7b is skipped. Then, control goes back to the step S3 and the processing at the step S3 is repeated. If on the other hand the time that is designated after the cursor 100X2 was moved does not belong to the past time as represented by a NO at the decision step S61, then control goes to the step S7b, whereat time is selected (the cursor 100X2 is moved). Then, control goes back to the step S3 and the processing at the step S3 is repeated.

According to the above-mentioned processing, even when the cursor is moved, the program whose broadcast has already been finished is not displayed so that only information that can be watched by the user is displayed and the user can select programs smoothly.

Figure 16:
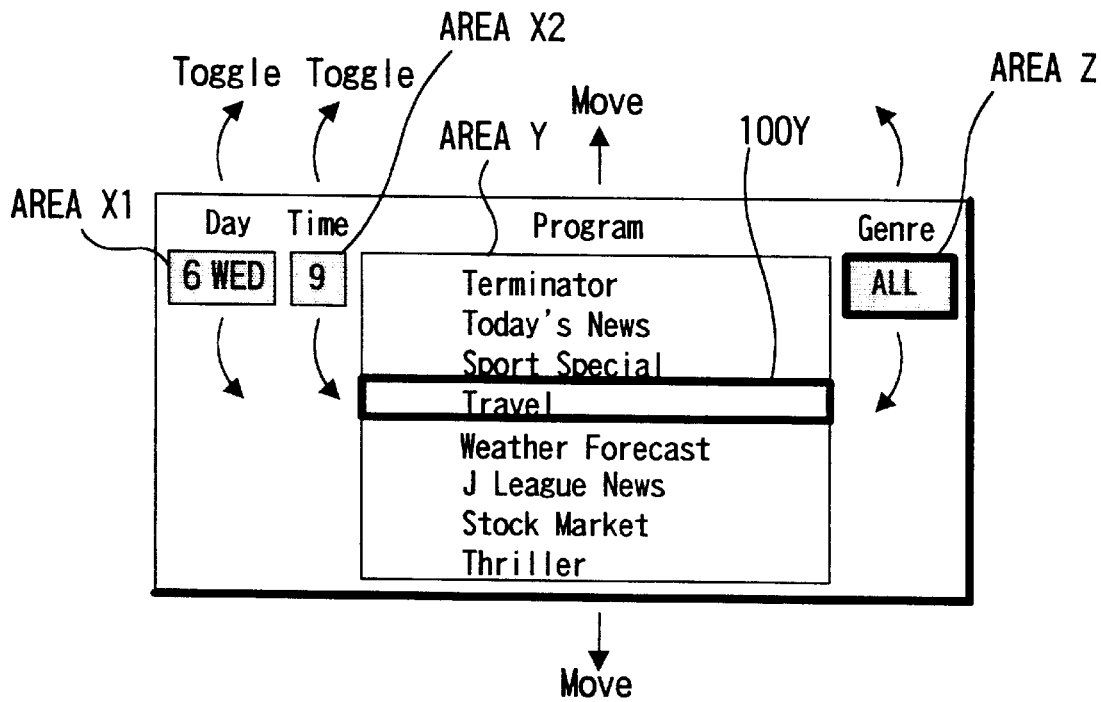
FIG. 16 is a pictorial representation illustrative of a further example of a manner in which the cylinder EPG is displayed on the screen of the monitor.

FIG. 16 is a schematic diagram showing other example in which the program list is displayed. The arrangement of this program list shown in FIG. 16 is fundamentally the same as that of the program list shown in FIG. 6 and only one information each is displayed on the area X1 in which date and day are displayed, the area X2 in which time is displayed and the area Z in which genre is displayed.

Specifically, as shown in FIG. 16, only "6 Wed" is displayed on the area X1, only "9:00" is displayed on the area X2 and only "ALL" is displayed on the area Z. The user can scroll information such as date displayed on each area by pressing the up-button switch 124 or the down-button switch 125 of the remote commander 4A and can select desired information.

Figure 17:
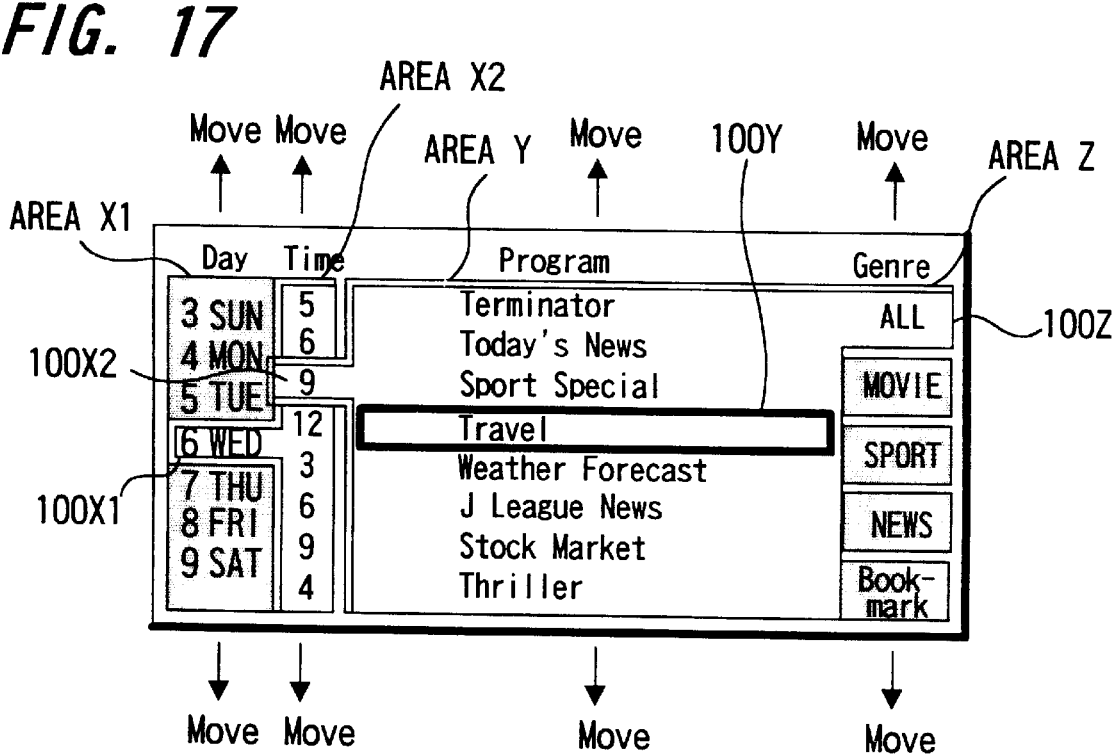
FIG. 17 is a pictorial representation illustrative of a yet further example of a manner in which the cylinder EPG is displayed on the screen of the monitor.

FIG. 17 is a schematic diagram showing a further example in which the program list is displayed. The arrangement of this program list shown in FIG. 17 is fundamentally the same as that of the program list shown in FIG. 6. However, a file of the next area is opened and displayed in response to the cursor position of the processing area.

Specifically, the area X2 is opened in accordance with the position at which the cursor 100X1 of the area X1 is disposed (in this case, 6 Wed). Also, the area Y is opened in accordance with the position at which the cursor 100X2 of the area X2 is placed (in this case, 9:00 a.m.) and the position at which the cursor 100Z of the area Z is placed (in this case, "ALL".

Figure 18:
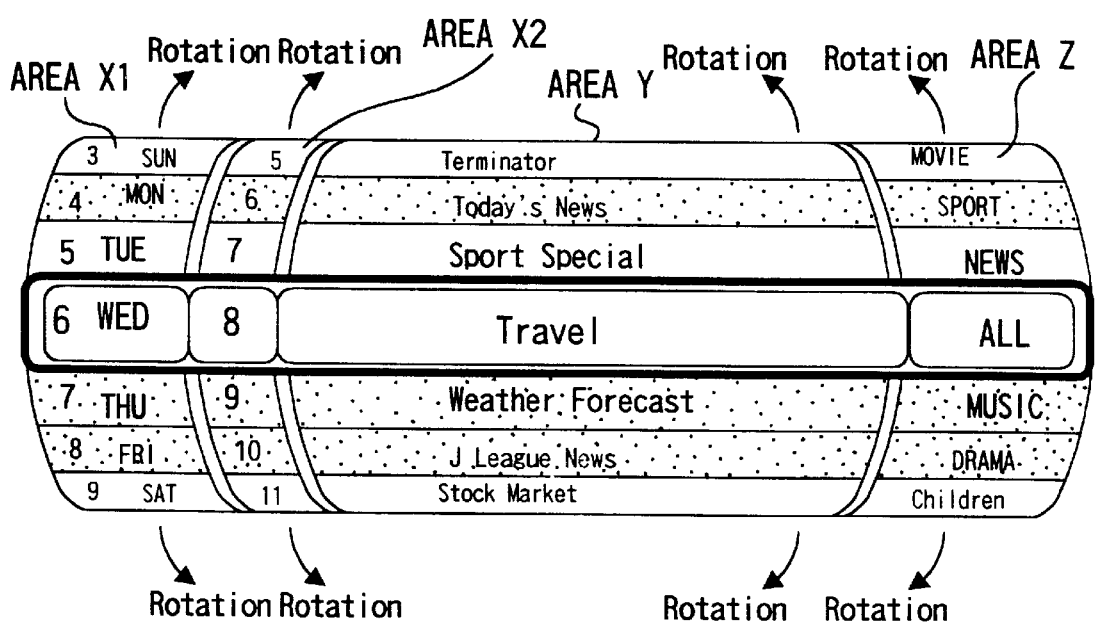
FIG. 18 is a pictorial representation illustrative of a still further example of a manner in which the cylinder EPG is displayed on the screen of the monitor.

FIG. 18 is a schematic diagram showing a yet further example in which the program list is displayed. The arrangement of this program list shown in FIG. 18 is fundamentally the same as that of the program list shown in FIG. 6. In this cylinder EPG, a cylinder-shaped EPG similar to that of the conceptual diagram shown in FIG. 5 is displayed on the screen of the monitor 10.

While the genre is displayed together with the broadcast day and time as described above, the principle of the present invention may be similarly applied to the case that display of one of them is omitted.

As set forth, according to the apparatus for and method of controlling electronic program guide display, since the display area of the display apparatus is divided into a plurality of longitudinal areas and information of program guide is placed in each area in accordance with the kind of information, program information can be obtained rapidly and accurately.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An electronic program guide display control apparatus for controlling a manner in which an electronic program guide for selecting a program out of a plurality of programs is displayed on a display apparatus, comprising:

data displaying means for displaying a broadcast data of each of said plurality of programs in a first area of a plurality of areas which result from dividing a display area of each of said plurality of programs on said display apparatus in the longitudinal direction;

title display means for displaying a title of each of said plurality of programs on a second area of a plurality of areas which result from dividing a display area of each of said plurality of programs on said display apparatus in the longitudinal direction, said title display means being independently positionable relative to said data displaying means;

first designating means for designating a predetermined one of said displayed broadcast data displayed in said first area;

first changing means for changing display of said second area to include at least one title of a program in accordance with said designated broadcast data;

second designating means for designating a predetermined one of said displayed titles displayed in said second area; and second changing means for changing display of said first area to include at least one broadcast data of a program in accordance with said designated displayed title.

2. The apparatus as claimed in claim 1, in which said title display means displays titles of said plurality of programs in the longitudinal direction in the sequential order of channel number.

3. The apparatus as claimed in claim 1, in which said data display means displays for each of said plurality of programs, a date and a time of said broadcast data on independent areas.

4. The apparatus as claimed in claim 1, in which said data displaying means displays a broadcast date of said broadcast data of each of said plurality of programs that has already passed in a different display fashion.

5. The apparatus as claimed in claim 1, in which said designating means further includes inhibiting means for inhibiting a broadcast date of said broadcast data of each of said plurality of programs that has already passed from being designated.

6. The apparatus according to claim 1, in which said title display means includes a starting time and a finishing time corresponding to each of said plurality of programs.

7. The electronic program guide display control apparatus according to claim 1, in which said title display means includes a channel number and a station logo corresponding to each of said selected programs.

8. The apparatus according to claim 1, further comprising genre display means for displaying a genre of each of said plurality of programs on a third area of a plurality of areas which result from dividing a display area of said display apparatus in the longitudinal direction.

9. The apparatus as claimed in claim 8, in which said changing means changes display on said second area to include at least one title of a program of a designated genre when a predetermined one genre of said genres on said third area is designated.

10. The electronic program guide display control apparatus according to claim 8, in which said genre includes a movie genre, a sport genre, a news genre, a drama genre, a music genre, a children genre, a preference genre, a present-channel genre and/or a book-mark genre.

11. An electronic program guide display control method for controlling a manner in which an electronic program guide for selecting a program out of a plurality of programs is displayed on a display apparatus, comprising the steps of:

displaying a broadcast data of each of said plurality of programs in a first area of a plurality of areas which result from dividing a display area of each of said plurality of programs on said display apparatus in a longitudinal direction;

displaying a title of each of said plurality of programs on a second area of a plurality of areas which result from dividing a display area of each of said plurality of programs on said display apparatus in a longitudinal direction, said second area being independently positionable relative to said displayed broadcast data;

displaying a genre of each of said plurality of programs in a third area of a plurality of areas which result from dividing a display area of each of said plurality of programs on said display apparatus in a longitudinal direction, said third area being independently positionable relative to said first area and said second area;

designating one of said displayed genres on said third area; and changing display of said second area to include at least one title of a program corresponding to said designated genre.

12. An electronic program guide display control method for controlling a manner in which an electronic program guide for selecting a program out of a plurality of programs is displayed on a display apparatus, comprising the steps of:

displaying a broadcast data of each of said plurality of programs in a first area of a plurality of areas which result from dividing a display area of each of said plurality of programs on said display apparatus in the longitudinal direction;

displaying a title of each of said plurality of programs on a second area of a plurality of areas which result from dividing a display area of each of said plurality of programs on said display apparatus in the longitudinal direction, said second area being independently positionable relative to said displayed broadcast data;

designating a predetermined one of said displayed broadcast data displayed in said first area;

changing display of said second area to include at least one title of a program in accordance with said designated broadcast data;

designating a predetermined one of said at least one displayed titles displayed in said second area; and changing the display of said first area to include at least one broadcast data of a program in accordance with said designated displayed title.

13. The electronic program guide display control method according to claim 12, further comprising the steps of:

selecting a program corresponding to one of said titles displayed on said second area;

displaying a picture corresponding to said selected program on a screen when said program is being broadcasted at an associated broadcast date; and displaying a program information corresponding to said selected program on said screen when said program in not being broadcasted.

14. The electronic program guide display control method according to claim 13, wherein said program information includes broadcast date and contents information corresponding to said selected program.

15. The electronic program guide display control method according to claim 13, wherein when said selected program is not being broadcasted, command icons are displayed on said screen.

16. The electronic program guide display control method according to claim 12, wherein a broadcast date of each of said plurality of programs that has already passed is inhibited from being designated.

17. The electronic program guide display control method according to claim 15, wherein said command icons include a return icon, a bookmark icon, a timer icon and a purchase icon.

18. The electronic program guide display control method according to claim 12, wherein the title of each of said plurality of programs are displayed in a longitudinal direction in a sequential order of a channel number.

19. The electronic program guide display control method according to claim 12, wherein a date and a time of said broadcast data are displayed on independent areas.

20. The electronic program guide display control method according to claim 12, wherein a broadcast date of each of said plurality of programs that has already passed is displayed in a different display fashion.

* * * * *